(12) United States Patent
Sezgin et al.

(10) Patent No.: US 12,339,761 B2
(45) Date of Patent: *Jun. 24, 2025

(54) INGESTING DATA TO A PROCESSING PLATFORM

(71) Applicant: Palantir Technologies Inc., Denver, CO (US)

(72) Inventors: Cenk Sezgin, Brooklyn, NY (US); Jasjit Grewal, Bethesda, MD (US); Thomas Pearson, Twickenham (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,047

(22) Filed: Mar. 13, 2023

(65) Prior Publication Data

US 2023/0259442 A1    Aug. 17, 2023

Related U.S. Application Data (63) Continuation of application No. 16/893,940, filed on Jun. 5, 2020, now Pat. No. 11,630,752.

(30) Foreign Application Priority Data

Jul. 12, 2019   (GB) ...................... 1910050

(51) Int. Cl.
*G06F 11/34*   (2006.01)
*G06F 8/61*    (2018.01)
*G06F 11/30*   (2006.01)

(52) U.S. Cl.
CPC ............ *G06F 11/3466* (2013.01); *G06F 8/61* (2013.01); *G06F 11/302* (2013.01); *G06F 11/3409* (2013.01)

(58) Field of Classification Search
CPC ............... G06F 11/3466; G06F 11/302; G06F 11/3409; G06F 8/61
See application file for complete search history.

(56) References Cited

U.S. PATENT DOCUMENTS 6,510,164 B1 * 1/2003 Ramaswamy .......... H04L 49/90
                                                     719/321
6,928,477 B1 * 8/2005 Leymann .............. G06F 9/5083
                                                     709/219

(Continued)

FOREIGN PATENT DOCUMENTS

EP    3764230    1/2021

OTHER PUBLICATIONS

Official Communication for European Patent Application No. 20178578.9 dated Nov. 30, 2020, 15 pages.

(Continued)

*Primary Examiner* — Azizul Choudhury
(74) *Attorney, Agent, or Firm* — Knobbe, Martens, Olson & Bear, LLP (57) ABSTRACT

Example embodiments describe a method performed by one or more processors. The method may comprise sending over a network, to a software component installed at a remote data source, a request to download data stored at, or in association with, the remote data source, the software component being configured to access performance data at said remote data source. In response to sending the request, the method may comprise receiving from the software component at least an indication of the performance data accessed by said software component, determining whether to proceed with the data download request or to modify the data download request based on the received performance data.

13 Claims, 4 Drawing Sheets

(56) References Cited

U.S. PATENT DOCUMENTS

| | | | |
|---|---|---|---|
| 7,013,330 B1 | 3/2006 | Tarbotton et al. | |
| 7,647,418 B2 | 1/2010 | Ash et al. | |
| 7,660,896 B1* | 2/2010 | Davis | G06F 9/505 709/224 |
| 7,752,626 B1* | 7/2010 | Pandey | H04L 67/1008 718/105 |
| 11,343,352 B1* | 5/2022 | Golden | H04L 67/60 |
| 11,630,752 B2 | 4/2023 | Sezgin et al. | |
| 2002/0198985 A1 | 12/2002 | Fraenkel et al. | |
| 2004/0034502 A1 | 2/2004 | Jung | |
| 2005/0120040 A1* | 6/2005 | Williams | H04L 67/62 707/999.102 |
| 2008/0155093 A1 | 6/2008 | Dharmistan | |
| 2009/0024993 A1 | 1/2009 | Reus et al. | |
| 2009/0199175 A1* | 8/2009 | Keller | G06F 9/455 717/178 |
| 2014/0047100 A1 | 2/2014 | Lachapelle et al. | |
| 2014/0075445 A1* | 3/2014 | Wang | H04L 43/08 718/104 |
| 2014/0143406 A1* | 5/2014 | Malhotra | G06F 11/3452 709/224 |
| 2015/0195157 A1* | 7/2015 | Nayyar | H04L 41/0681 709/224 |
| 2016/0055042 A1* | 2/2016 | Kwong | H04L 67/1029 719/314 |
| 2017/0269893 A1* | 9/2017 | Samuel | G06F 3/14 |

OTHER PUBLICATIONS

Official Communication for European Patent Application No. 20178578.9 dated Mar. 3, 2021, 14 pages.

Official Communication for European Patent Application No. 20178578.9 dated Oct. 18, 2023, 14 pages.

Official Communication for European Patent Application No. 20178578.9 dated Jun. 24, 2024, 12 pages.

* cited by examiner

Fig. 3

INGESTING DATA TO A PROCESSING PLATFORM

INCORPORATION BY REFERENCE TO ANY PRIORITY APPLICATIONS

This application is a continuation of U.S. patent application Ser. No. 16/893,940, filed Jun. 5, 2020, and titled "INGESTING DATA TO A PROCESSING PLATFORM." The entire disclose of the above item is hereby made part of this specification as if set forth fully herein and incorporated by reference for all purposes, for all that it contains. Any and all applications for which a foreign or domestic priority claim is identified in the Application Data Sheet as filed with the present application are hereby incorporated by reference under 37 CFR 1.57.

TECHNICAL FIELD

The present disclosure relates to a method and systems for ingesting data to a processing platform, for example ingesting data from a data source operated by an external organisation running one or more applications which generates data for ingesting to the data source.

BACKGROUND

Cloud computing is a computing infrastructure for enabling ubiquitous access to shared pools of servers, storage, computer networks, applications and other data resources, which can be rapidly provisioned, often over a network, such as the Internet.

A "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database, or part of a spreadsheet or part of a database, e.g. records or datasets.

Some companies provide cloud computing services for registered customers, for example manufacturing, scientific and technology companies, to create, store, manage and execute their own resources via a network. This enables customers to offload data storage and data transformation, data analysis functions etc. to a cloud-based platform having appropriate resources and computing power for providing secure access to the data resources, potentially for many registered users of the customer.

The platform may also provide applications, services and microservices for performing additional functions, such as specific transformations or analysis on the data, thereby negating the need for the customer to install such applications, services and microservices on their own servers and provide the consequential support and maintenance.

The platform may need to ingest, that is receive or download, large quantities of data from external customer systems. The customer systems may be referred to as data sources. The data of the data sources may be generated by one or more applications running at said customer systems, which applications may operate using code native to the application server of the customer system. For example, the data sources may comprise data generated at one or more applications running on an application server of the customer system. Ingesting large amounts of data from the data source may have adverse effects on the application server, which may for example affect users trying to perform day-to-day tasks using the applications server.

SUMMARY

According to an example embodiment, there is provided a method, performed by one or more processors, comprising:

sending over a network, to a software component installed at a remote data source, a request to download data stored at, or in association with, the remote data source, the software component being configured to access performance data at said remote data source;

in response to sending the request, receiving from the software component at least an indication of the performance data accessed by said software component; and determining whether to proceed with the data download request or to modify the data download request based on the received performance data.

Modifying the data download request may comprise pausing the data download request.

Pausing the data download request may comprise pausing the data download request for a predetermined time period.

The method may further comprise re-sending the data download request after the predetermined time period, and determining whether to proceed with the re-sent data download request based on received up-to-date performance data accessed by said software component, and determining whether to proceed with, or pause the data download request based on the up-to-date performance data.

The predetermined time period to pause the data download request may increase for subsequent pauses.

The accessed performance data may comprise performance metrics comprising one or more of RAM usage, CPU usage, process usage, and number of users.

Determining whether to proceed with, or modify the data download request may comprise accessing one or more thresholds representing the or each performance metrics against which to test the received performance data.

The method may further comprise sending an initialisation request to the software component, the initialisation request being a paging request for requesting the data source to build a page comprising N data objects, N being user-configurable, wherein the download request is sent subsequently, and wherein proceeding with the data download request is only performed if the page comprising the N data objects has been built.

A message may be returned from the software component if the page comprising the N data objects has not been built, and responsive to said message, the data download request is paused and the data download request re-sent after a predetermined time period.

The method may further comprise receiving a requested page comprising N data objects from the software component and sending, in response to receiving the page, an acknowledgment message to the software component for causing another page comprising a different set of N data objects to be built.

The method may further comprise sending to the software component a unique identifier associated with the download request and one or more subsequent download requests, wherein the unique identifier is used by the software component to recognise that download requests are associated with a common target system, and responsive thereto, receiving incremental updates made at the data source made subsequent to a previous request with the same unique identifier.

The method may further comprise providing access at a target system, via the software component, to one or more application-layer resources made available to the source system.

According to another example embodiment, there is provided a method, performed by one or more processors, comprising:
  receiving by a software component, installed at a data source from a remote target, a request to download data stored at, or associated with, the data source;
  accessing, by the software component, performance data of the data source;
  in response to receiving the request, sending from the software component to the target at least an indication of the performance data accessed by the software component; and
  proceeding with the data download request only in response to a further request from the remote target.

The method may further comprise re-receiving the data download request after a predetermined time period, and providing up-to-date performance data accessed by said software component which is sent to the remote target for determining whether to proceed with the data download.

The re-received data download request is received after a predetermined time period determined by the remote target.

The accessed performance data may comprise performance metrics comprising one or more of RAM usage, CPU usage, process usage, and number of users, and wherein the software component determines which of the performance metrics to send to the remote target based on configuration data received therefrom.

The method may further comprise receiving an initialisation request by the software component, the initialisation request being a paging request for requesting the data source to build a page comprising N data objects, N being user-configurable, wherein the download request is received subsequently, and a message is subsequently returned to the remote target responsive to the download request if the page comprising N data objects has not been built.

The method may further comprise receiving by the software component a unique identifier associated with the download request and one or more subsequent download requests, wherein the unique identifier is used by the software component to recognise that download requests are associated with a common target system, and responsive thereto, sending to the remove target incremental updates made at the data source made subsequent to a previous request with the same unique identifier.

The method may further comprising provide access to a target system, via the software component, to one or more application-layer resources made available to the source system.

According to another example embodiment, there may be provided a computer program, optionally stored on a non-transitory computer readable medium program which, when executed by one or more processors of a data processing apparatus, causes the data processing apparatus to carry out a method according to any preceding method definition.

According to another example embodiment, there may be provided an apparatus configured to carry out a method according to any of preceding method definition, the apparatus comprising one or more processors or special-purpose computing hardware.

BRIEF DESCRIPTION OF THE DRAWINGS

Example embodiments will now be described by way of non-limiting example with reference to the accompanying drawings, in which.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Example embodiments relate to enabling external access to a data processing platform. Example embodiments also relate to performance of one or more processing tasks or operations at a system external to the data processing platform, typically remote from the data processing platform. The data processing platform may be a cloud-based platform, offering access to customers for the purposes of one or more of storage, applications, analysis and reporting via data resources. The data processing platform may be termed an integrated data processing platform on account of it providing multiple applications for multiple datasets for, potentially multiple customers having multiple users. A customer may be a company providing technology or scientific services, or indeed other services.

As mentioned, a "data resource" as used herein may include any item of data or code (e.g., a data object) that can be used by one or more computer programs. In example embodiments, data resources may be stored in one or more network databases or on external databases and may be capable of being accessed by applications hosted by servers that share common access to the network database. A data resource may for example be a data analysis application, a data transformation application, a report generating application, a machine learning process, a spreadsheet or a database, or part of a spreadsheet or part of a database, e.g. records or datasets. The term dataset is used herein generically.

A data processing task, or simply "task", is a requested operation that may comprise performance of one or more data transforms.

A "plug-in" is a software component that adds one or more specific features to an existing computer program, for example a server system. For example, a "plug-in" may be provided by a data processing platform to an application server of one or more customer systems to extend their capabilities. The plug-in may be written in code native to the application server. A plug-in may be an agent.

A "data source" is a computer system that generates data requiring storage at a remote computer system, for example a data processing platform.

A "target" is a computer system that is ingesting the data from one or more data sources.

"Ingesting" may mean downloading data from a data source.

"Performance data" may comprise any data representing one or more performance metrics associated with a data source, for example, one or more of RAM usage, CPU usage, process usage, and number of users.

Figure 1:
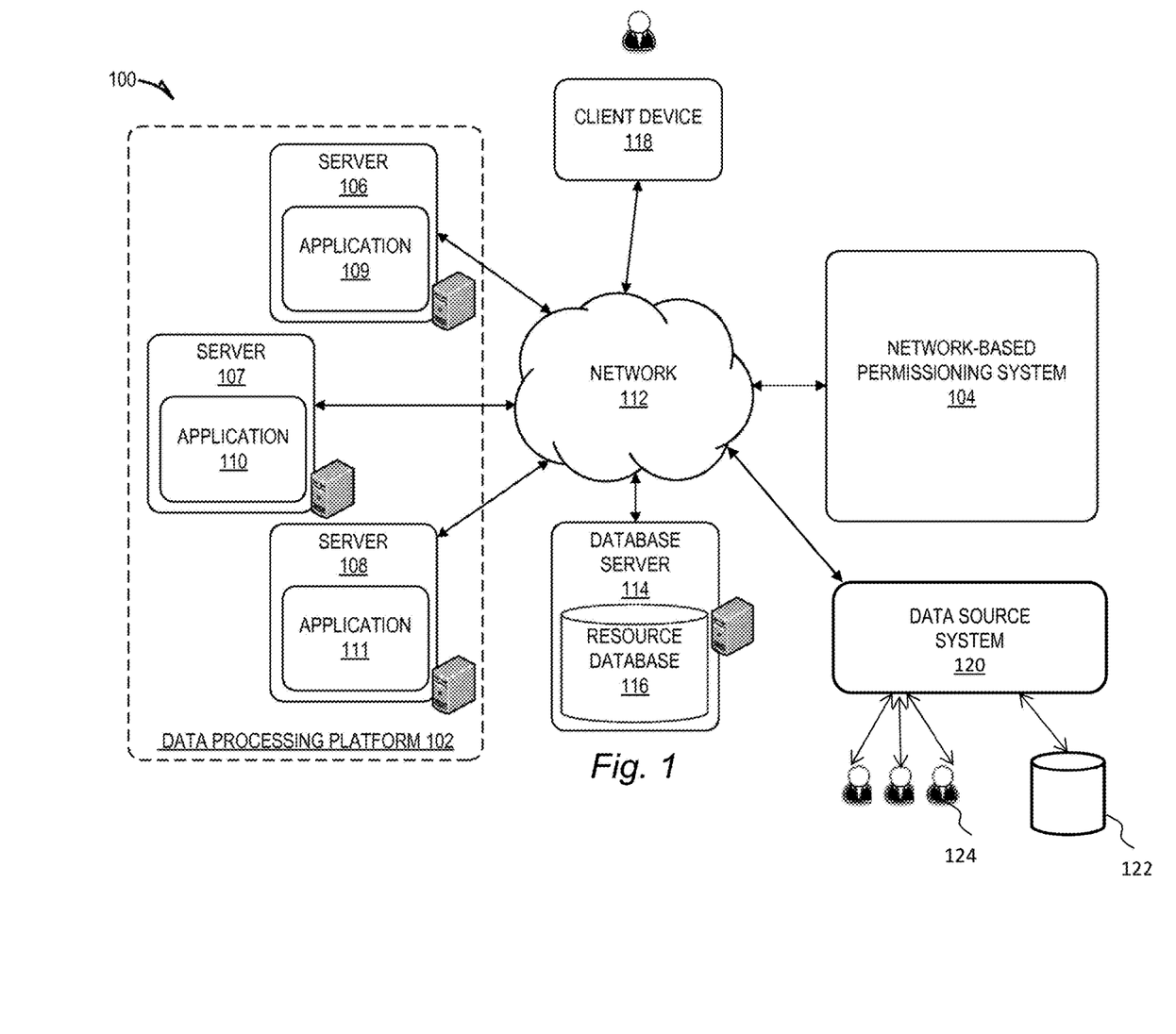
FIG. 1 is a block diagram illustrating a network system comprising a group of application servers of a data processing platform according to embodiments of this specification.

FIG. 1 is a network diagram depicting a network system 100 comprising a data processing platform 102 in communication with an external data source system 120 (for example associated with a customer organisation) and also a network-based permissioning system 104 configured for evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

In the example of FIG. 1, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 may be in communication with the network-based permissioning system 104 and external data source system 120 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

The data source system 120 may comprise one or more application servers for running particular software applications, useful to one or more users 124 of the data source system. For example, the data source system 120 may use an application server for running a so-called Systems, Applications and Products (SAP) application. The software application may generate a large amount of data which it stores in real-time to source data objects 122, and said data objects are provided at the application layer, rather than requiring access to a database. Applications running on an application server of the data source system 120 may be of any type that generates relatively large amounts of data.

The data processing platform 102 may be termed a target system because it periodically ingests data from the data source system 120, for example, to enable the customer organisation associated with the data source system to perform analytics and/or decision making processes on the ingested data. Data ingestion may also be referred to as harvesting, and typically is downloaded in response to one or more requests issued by the data processing platform.

In overview, methods, systems and computer programs are disclosed for sending over a network, to a software component, for example a plug-in or alternative or equivalent software installed at remote data source, a request to download data stored at, or in association with, the remote data source, the plug-in being configured to access performance data at said remote data source. In response to sending the request, the methods, systems and computer programs may receive from the plug-in at least an indication of the performance data accessed by said plug-in. Further, the methods, systems and computer programs may determine whether to proceed with the data download request or to modify the data download request based on the received performance data.

In some embodiments, the target system, which may comprise the data processing platform 102 or, rather, one of the application servers 106-108 thereof, may deploy a plug-in for installation at the data source system 120, for example on a particular application server thereof. The plug-in may be configured to act as a connector or agent, and resides in the data source system 120 that exposes a RESTful application programming interface (API.) The plug-in may be coded in the native code of one or more applications or application servers running on the data source system 120 so as to facilitate bidirectional data transfer between the target system and the data source system 120. Moreover, the plug-in may be configured to acquire performance data relating to the data source system 120, thereby to obtain a real-time or near real-time status of one or more performance metrics. For example, these may comprise one or more of RAM usage, CPU usage, process usage, and number of users. This performance data may be automatically returned to the target system which provides software for receiving said performance data and, based on values associated with the one or more metrics, may decide whether or not to proceed with a data ingestion request.

For example, the target system may periodically request data to download from the data source system 120. However, the target system may wish to avoid the data source system 120 from crashing or slowing down, causing problems for the one or more users 124. This may be the case, for example, where relatively large amounts of data (potentially tens of millions of rows of data) are requested. If the CPU of the relevant application server is currently under heavy use, then there is the potential for the application server to slow down. Therefore, the target system, in providing said plug-in, may determine when to download data from the data source system 120. In sending a data request to the plug-in, therefore, the target system will make a determination either to continue with the download, or to modify it. For example, modifying may comprise pausing the download request for a predetermined period of time, before repeating the request and acquiring up-to-date performance data, whereafter the process repeats. In some embodiments, the period to 'back-off' requests may increase, e.g. exponentially. In some embodiments, modifying the download request may comprise requesting a different amount of data, e.g. a reduced number of rows.

The determination as to whether or not to proceed may be based on one or more configurable rules provided at the target system software. For example, the rules may comprise "if the CPU usage is above 60% and the number of users is above 10, then modify." Another example is "if the percentage of free RAM is lower than 5%, do not start the download". Another example is "if the CPU utilization rate, e.g. idle total or idle true is less than 10%, do not start the download". Another example is "if the average process waiting time is greater than ten, then do not start the download". Users may configure the rules at the target software system, and the thresholds, to whatever suits their needs or those of the data source system 120. There may therefore be provided, for one or more performance metrics, a threshold, for determining what permits or pauses/modifies a download request. In some embodiments, machine learning may be used to learn what combinations of rules and associated metric values provide the best download v performance results over time.

In some embodiments, the plug-in may also send download requests in the form of paging requests and/or iterative requests, to be explained later on.

Figure 2:
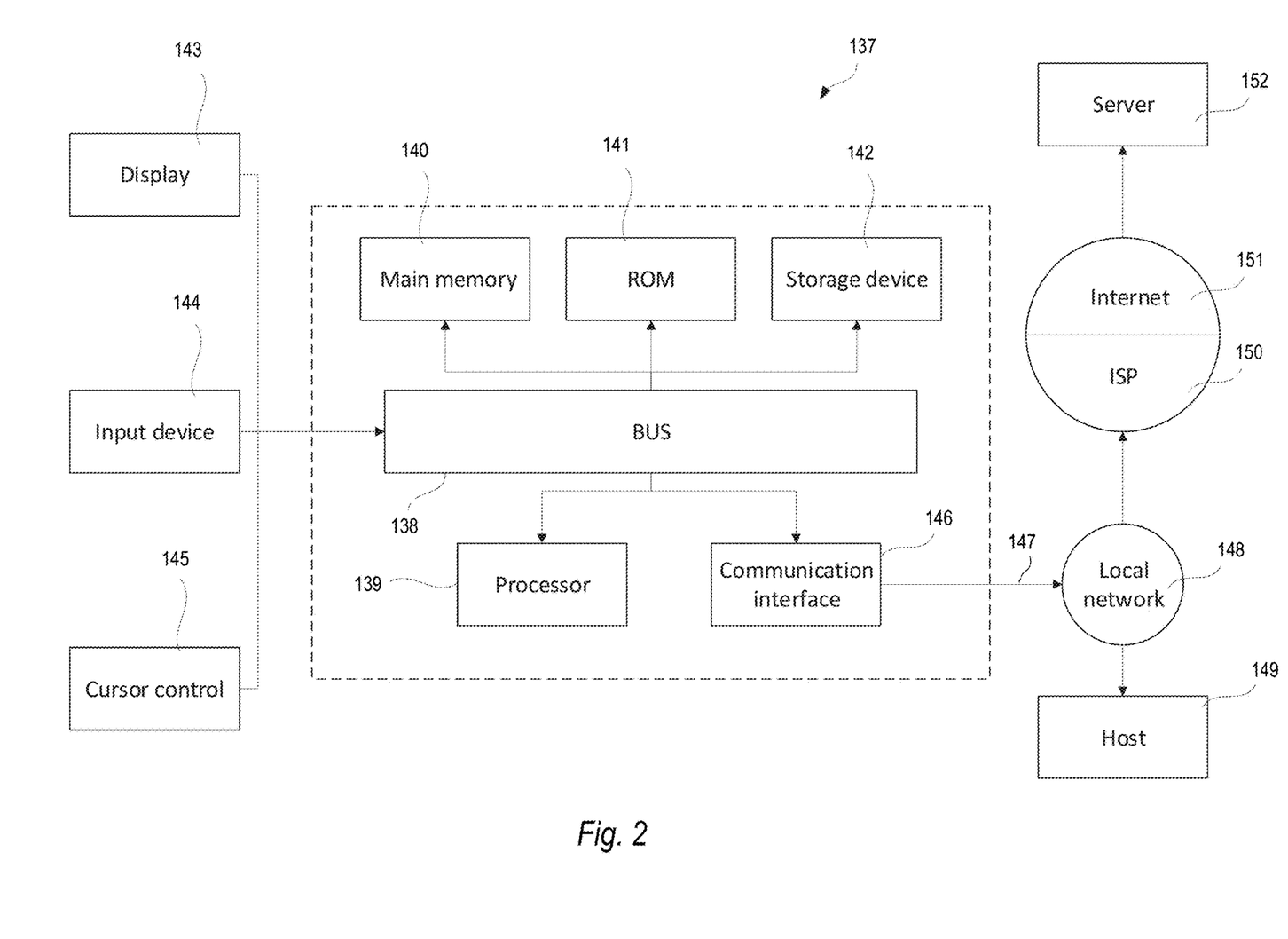
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114, the data source system 120 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

Figure 3:
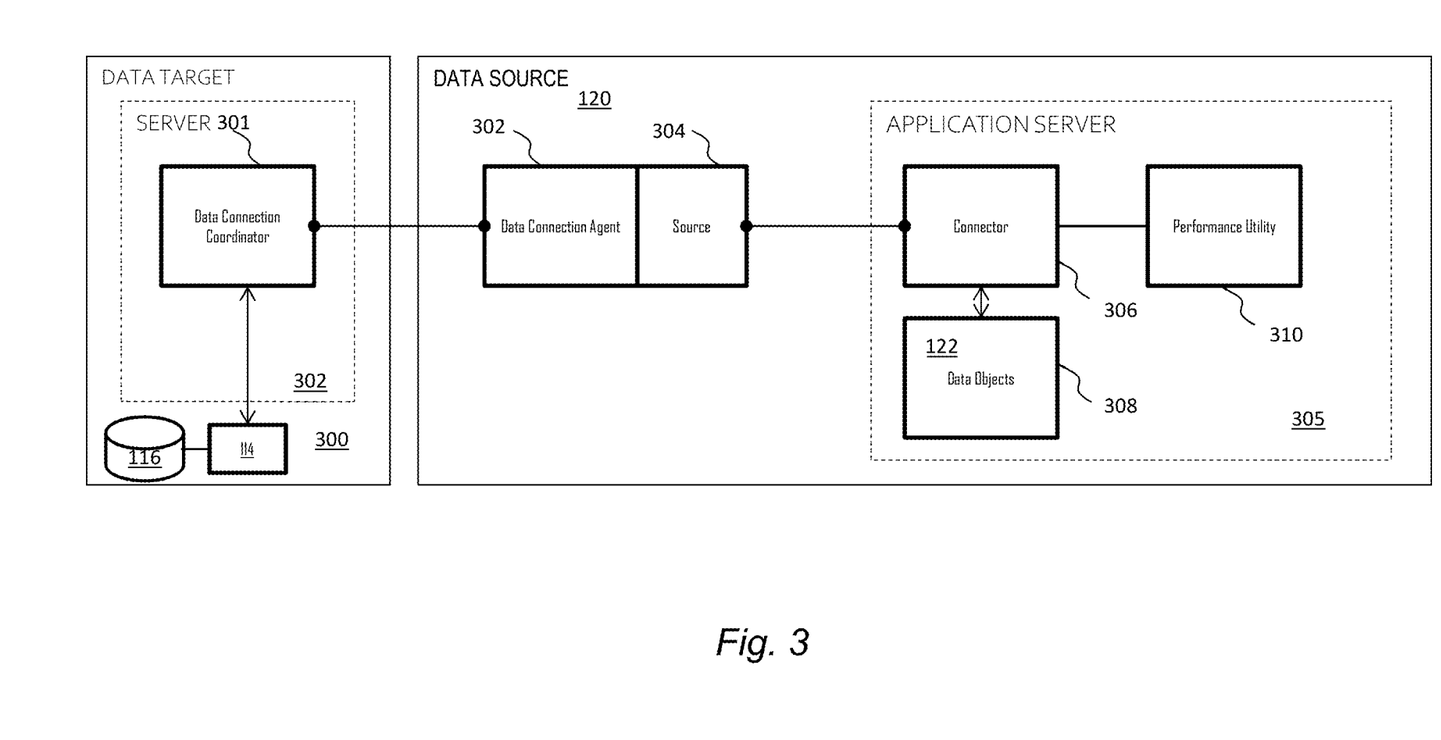
FIG. 3 is a schematic diagram of a data target and data source configured according to embodiments of this specification.

Referring to FIG. 3, a more detailed view of a data target 300 and a data source system 120 is shown. The data target 300 may be any system remote from the data source system 120 that wishes to ingest data from the data source system 120. The data target 300 may provide a server 302 that coordinates, by means of software referred to as a data connection coordinator 301, data connections with the data source system 120 and possibly with other data source systems 120. Also provided in the data target may be a database controller 114 and a database 116.

The data source system 120 may comprise a data connection agent 302 and source 304 which facilitate data flow between the data connection coordinator 301 and an application server 305. The application server 305 is configured to run an application, and is provided with a plug-in referred to herein as a connector 306. The connector 306 is that component which may communicate with a database 308 of the data source system 120, storing data that the data target 300 wishes to download, and a performance utility 310, which provides one or more up-to-date performance metrics, as mentioned above. The connector 306 may be acquired from the data target 300 or from any third-party provider. The performance utility may be similar to the Resource Manager in a Windows Task Manager utility.

Figure 4:
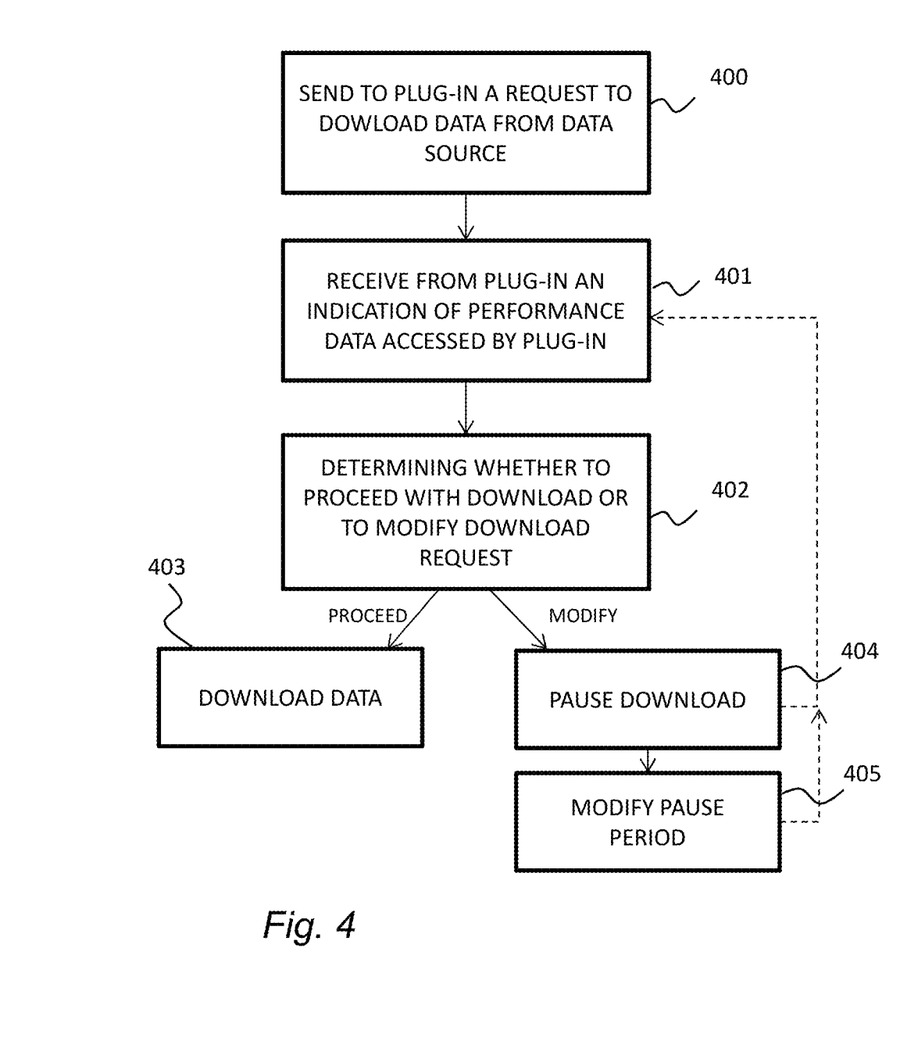
FIG. 4 is a flow diagram showing processing operations that may be performed by according to embodiments of this specification.

FIG. 4 is a flow diagram showing example processing operations that may be performed by the data target 300, for example by the data connection coordinator 301, in accordance with example embodiments. More or less operations may be involved in other embodiments. Some operations may be performed in parallel. Some operations may be performed by different modules associated with the same network location.

A first operation 400 may comprise sending to a plug-in a request to download data from a data source.

A second operation 401 may comprise receiving from the plug-in an indication of the performance data accessed by the plug-in.

A third operation 402 may comprise determining whether to proceed or to modify the download request, based on the received performance data. Such a determination may be made based on default settings or user-configured rules, as mentioned above.

A fourth operation 403, responsive to determining that a download request should proceed, may comprise downloading the data, for example by sending a further confirmation request.

A fifth operation 404, responsive to determining that the download request should be modified, may comprise, in this example, pausing the download for a period of time. The period of time, i.e. the pause period, may be predetermined, e.g. thirty minutes.

The process may then return to the second operation 401. Optionally, a sixth operation 405 may follow whereby the pause period is modified. For example, it may increase steadily or exponentially for subsequent iterations where the third operation 403 determines a pause. The process may then return to the second operation 401.

Figure 5:
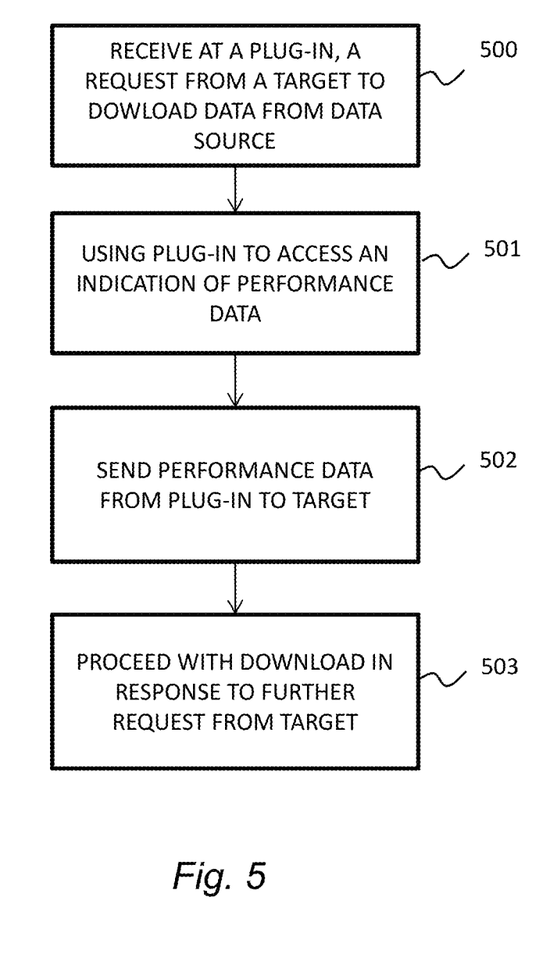
FIG. 5 is a flow diagram showing processing operations that may be performed by according to other embodiments of this specification.

FIG. 5 is a flow diagram showing example processing operations that may be performed by the data source 120, for example by the connector 306, in accordance with example embodiments. More or less operations may be involved in other embodiments. Some operations may be performed in parallel. Some operations may be performed by different modules associated with the same network location.

A first operation 500 may comprise receiving, at the connector 306, a request from the target to download data from the data source.

A second operation 501 may comprise using the connector 306 to access an indication of performance data, e.g. from the performance utility 310.

A third operation 502 may comprise sending the performance data from the connector 306 to the target, e.g. the data connection coordinator 301.

A fourth operation 503 may comprise proceeding with the download (or upload) in response to a further, confirmation request from the data target 300.

In some embodiments, the manner of downloading by the data target 300 may comprise a paging request or an incremental request.

A paging request may comprise requesting one or more pages of data, that is data comprising a page of N rows of data, e.g. ten thousand rows, or N data objects. This is as opposed to requesting all data in one set, although if the amount of data is smaller than the page 'length' then it will be received in one page. A user of the data target 300 may, by means of a user interface of the data connection coordinator 301, configure how many rows of data may comprise an individual page.

A paging request may commence by the data target 300, via the data connection coordinator 301, sending an initialisation request to the plug-in, i.e. the connector 306. The initialisation request may inform the connector 306 that a particular set of data is to be downloaded and the page length. The connector 306 may then commence building its first page of data, which will take a finite time period. Subsequently, the data connection coordinator 301 may request the data. If the connector 306 determines that the page is not yet built, i.e. not yet complete, then an appropriate response message is sent back to the data connection coordinator 301 which then waits for a pause period before re-requesting. Only once the first page is built is it stored, temporarily, for a subsequent request. The connector 306 may then start building the second page. When the subsequent request comes from the data connection coordinator 301, the first page download may take place, and the connector 306 may also delete the temporarily stored first page upon confirmation that the first page has been received by the data connection coordinator 301. The process continues for subsequent pages until all data has been added to a respective page and all such pages have been confirmed as received at the data connection coordinator 301. If the data connection coordinator 301 continues to request pages, then a "no data left" message or the like may be returned by the connector 306.

Paging requests may be handled in conjunction with the above operations relating to holding back on processing such requests based on performance data.

An incremental request may be more appropriate where a source database stores very large datasets, e.g. millions of rows, but adds to them in an incremental way, e.g. by adding rows of new data. Rather than downloading all of the data needed, it may be more appropriate to download only the changes, i.e. deltas.

In some embodiments, incremental downloads are handled in the following way. For example, a request may be sent by the data connection coordinator 301 to the connector 306 with a unique identifier, e.g. a universally unique identifier (UID.) The connector 306 may then log that UID and use it to recognise subsequent requests from the same target or target process. The connector 306 may thereafter only provide for downloading those changes that have occurred to the requested data in the database since the last request. For example, the connector 306 may add a timestamp to the last set or row of data provided to the data connection coordinator 301 and uses this to determine what has changed since then. Alternatively, the connector 306 may identify the last row that was sent, assuming new data is added to subsequent rows of the database.

Incremental requests may be handled in conjunction with the above operations relating to holding back on processing such requests based on performance data.

In some embodiments, the connector 306 may also provide access to one or more software applications or functionality running on the application server 305, to allow a user or process on the data target 300 to see and utilise those applications or functionality.

The connector 306 may expose access over HTTP(S), by running a web service to enable the data connection agent 302 to request underlying data components over HTTP(S).

The target may send the request to an application layer on the data source 120, independent of the database that is used. There may be no direct database access, and all data may be acquired via the application layer.

The connector 306 may co-exist on the same application server, or on an independent application server.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

Advantageously, the above methods, systems and computer-readable code, according to some embodiments, enable integration with any generic service or application which is external to the data processing platform 102. The service or application may implement a Representational State Transfer (REST) architectural style providing interoperability between networked computer systems. Alternatively, the service or application may be connected via a Java Database Connectivity (JDBC)-like interface. SAS and MATLAB are given as examples of specialised task-performing applications that may be implemented externally for generating new datasets from received or ingested datasets. By generating and storing metadata in association with externally-generated datasets, provenance and lineage of the external builds can be maintained, and issues relating to out of date or "stale" datasets can be automatically detected and, if required, action taken. The data processing platform 102 may maintain a version control system that represents all code changes on the external system 176. Further, complex code or datasets such as chemical, pharmaceutical or engineering models need not leave the external system and nor need they be re-written on a different platform.

In some embodiments, an agent 170 may be provided for respective external applications. For example, one agent may be provided for external SAS applications and other agent may be provided for MATLAB.

In some embodiments, the code that is to be executed at the external system 176 may be created via the data processing platform 102. For example, the external system 176 may not have a version control system or even a central code storage system, and hence the 'system of record' version or 'master' version of the code may be provided in the data processing platform 102. The code may be sent to the external system 176 for execution in the manner described above.

In some embodiments, the agent 170, for example the external connector 174, may only have access to a specific location on the external system 176 from where it reads code. This may enable the customer to maintain a location, e.g. one or more directories of promoted code that is considered ready and safe for execution in association with the data processing platform 102.

In some embodiments, the external connector 174 may have at least two configurations. A first, source configuration enables linking the data processing platform 102 with the external system 176, including parameters such as the external system URL and credentials. A second, build configuration may enable receipt and provision of input datasets, output datasets, code references etc.

In some embodiments, the agent 170 may reside on the same or a different server than the external system 176.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method, performed by one or more processors, comprising:
  receiving, by a target device, and from a software component installed at a remote data source, at least an indication of performance data accessed by said software component, wherein the performance data is associated with one or more application servers executing on the remote data source and configured to run an application and provide interactivity to one or more users of the remote data source, and wherein the performance data comprises metrics of resource utilization on the remote data source running the application;
  determining, by the target device, and based on the indication of the performance data received from the software component installed at the remote data source, either to proceed with a download of first data stored at the remote data source, or to modify the download;
  in response to determining, based on the received indication of the performance data, to proceed with the download, proceeding, by the target device, to download the first data; and
  in response to determining, based on the indication of the performance data received from the software component installed at the remote data source and running the application, to modify the download, proceeding, by the target device, with downloading second data stored at the remote data source, wherein the second data is different from the first data in that the second data comprises a different quantity of rows of data as compared to the first data, and wherein the second data comprises a different amount of data as compared to the first data.

2. The method of claim 1 further comprising:
  in response to determining to modify the download, pausing the download for a first period of time.

3. The method of claim 2 further comprising:
  after the first period of time, receiving, from the software component, at least an indication of updated performance data associated with the one or more application servers; and
  determining, based on the received indication of the updated performance data, whether to proceed with the download or to pause the download for a second period of time.

4. The method of claim 3, wherein the second period of time is increased as compared to the first period of time.

5. The method of claim 1, wherein the performance data comprises performance metrics comprising one or more of RAM usage, CPU usage, process usage, or number of users.

6. The method of claim 5, wherein determining whether to proceed with or modify the download comprises accessing one or more thresholds representing one or more of the performance metrics against which to test the received indication of the performance data.

7. The method of claim 1 further comprising:
  sending an initialisation request to the software component, the initialisation request being a paging request for requesting the remote data source to build a page comprising N data objects, N being user-configurable, wherein a download request is sent subsequently, and wherein proceeding with the download is only performed if the page comprising the N data objects has been built.

8. The method of claim 7, wherein a message is returned from the software component if the page comprising the N data objects has not been built, and responsive to said message, the download is paused and the download request is re-sent after a predetermined time period.

9. The method of claim 8 further comprising:
  receiving a requested page comprising N data objects from the software component; and
  sending, in response to receiving the page, an acknowledgment message to the software component for causing another page comprising a different set of N data objects to be built.

10. The method of claim 1 further comprising:
  sending to the software component a unique identifier associated with the download and one or more subsequent download requests, wherein the unique identifier is used by the software component to recognize that download requests are associated with a common target system, and responsive thereto, receiving incremental updates made at the remote data source made subsequent to a previous request with the same unique identifier.

11. The method of claim 10 further comprising:
providing access at a target system, via the software component, to one or more application-layer resources made available to the remote data source.

12. A system comprising:
one or more computer readable storage mediums having program instructions embodied therewith; and
one or more processors configured to execute the program instructions to cause the system to perform the method of claim 1.

13. A computer program product comprising one or more computer-readable storage mediums having program instructions embodied therewith, the program instructions executable by one or more processors to cause the one or more processors to perform the method of claim 1.

* * * * *